(12) United States Patent
Gainey et al.

(10) Patent No.: US 8,630,211 B2
(45) Date of Patent: Jan. 14, 2014

(54) HYBRID RADIO ARCHITECTURE FOR REPEATERS USING RF CANCELLATION REFERENCE

(75) Inventors: Kenneth M. Gainey, San Diego, CA (US); James Arthur Proctor, Jr., Melbourne Beach, FL (US); Dhananjay Ashok Gore, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 725 days.

(21) Appl. No.: 12/827,669

(22) Filed: Jun. 30, 2010

(65) Prior Publication Data

US 2012/0002586 A1 Jan. 5, 2012

(51) Int. Cl.
- *H04B 7/14* (2006.01)
- *H04B 3/20* (2006.01)
- *H04B 3/36* (2006.01)
- *H04B 7/185* (2006.01)
- *H04B 7/165* (2006.01)
- *H04J 3/08* (2006.01)

(52) U.S. Cl.
USPC ........... 370/279; 370/286; 370/289; 370/293; 370/315; 370/317; 370/501; 455/13.3; 455/20; 455/23; 455/24

(58) Field of Classification Search
USPC ......... 370/378–379, 282, 286, 289, 290, 293, 370/315, 317, 501; 455/13.3, 20, 23, 24
See application file for complete search history.

(56) References Cited

U.S. PATENT DOCUMENTS

| | | |
|---|---|---|
| 5,584,059 A | 12/1996 | Turney et al. |
| 5,630,227 A | 5/1997 | Bella et al. |
| 6,487,398 B1 | 11/2002 | Nobbe et al. |
| 6,895,232 B2 | 5/2005 | Parker |
| 7,110,732 B2 | 9/2006 | Mostafa et al. |
| 7,174,136 B2 | 2/2007 | Marshall et al. |
| 7,206,557 B2 | 4/2007 | Aytur et al. |
| 7,564,910 B2 | 7/2009 | Kostic |
| 7,636,385 B2 * | 12/2009 | Park et al. ............. 375/211 |

(Continued)

FOREIGN PATENT DOCUMENTS

| | | |
|---|---|---|
| EP | 1724946 A1 * | 11/2006 |
| EP | 2053812 A2 * | 4/2009 |

(Continued)

OTHER PUBLICATIONS

International Search Report and Written Opinion—PCT/US2011/042687, ISA/EPO—Oct. 21, 2011.

(Continued)

*Primary Examiner* — Redentor Pasia
(74) *Attorney, Agent, or Firm* — Thien T. Nguyen (57) ABSTRACT

A wireless repeater includes a receiver circuit implemented as an intermediate frequency (IF) subsampling receiver and a transmitter circuit implemented as a direct conversion (zero-IF) transmitter. The repeater further includes a reference receiver implemented as an IF subsampling receiver to sample a portion of the transmit signal prior to over-the-air transmission for use as the reference signal for channel estimation. Highly accurate channel estimation is obtained by using the reference signal from the reference receiver as the reference signal accounts for distortions in the transmitter circuit of the repeater. The repeater may include an echo canceller to cancel an estimated feedback amount from an input signal based on the channel estimation.

22 Claims, 5 Drawing Sheets

(56) References Cited

U.S. PATENT DOCUMENTS

| | | |
|---|---|---|
| 7,664,520 B2 | 2/2010 | Gu |
| 2006/0193271 A1 | 8/2006 | Proctor, Jr. et al. |
| 2007/0268846 A1 | 11/2007 | Proctor, Jr. et al. |
| 2008/0176513 A1 | 7/2008 | Braithwaite et al. |
| 2008/0225775 A1 | 9/2008 | Proctor, Jr. et al. |
| 2009/0323582 A1 | 12/2009 | Proctor, Jr. et al. |
| 2010/0167639 A1* | 7/2010 | Ranson et al. .................. 455/24 |
| 2010/0329311 A1* | 12/2010 | Hannan et al. ................ 375/149 |

FOREIGN PATENT DOCUMENTS

| | | |
|---|---|---|
| WO | 2005008916 A1 | 1/2005 |
| WO | 2008004916 A1 | 1/2008 |
| WO | 2009014281 A1 | 1/2009 |

OTHER PUBLICATIONS

Taiwan Search Report—TW100123139—TIPO—Aug. 16, 2013.

* cited by examiner

HYBRID RADIO ARCHITECTURE FOR REPEATERS USING RF CANCELLATION REFERENCE

BACKGROUND

1. Field

This disclosure generally relates to repeaters in wireless communication systems.

2. Background

Wireless communication systems and techniques have become an important part of the way we communicate. However, providing coverage can be a significant challenge to wireless service providers. One way to extend coverage is to deploy repeaters.

Figure 1:
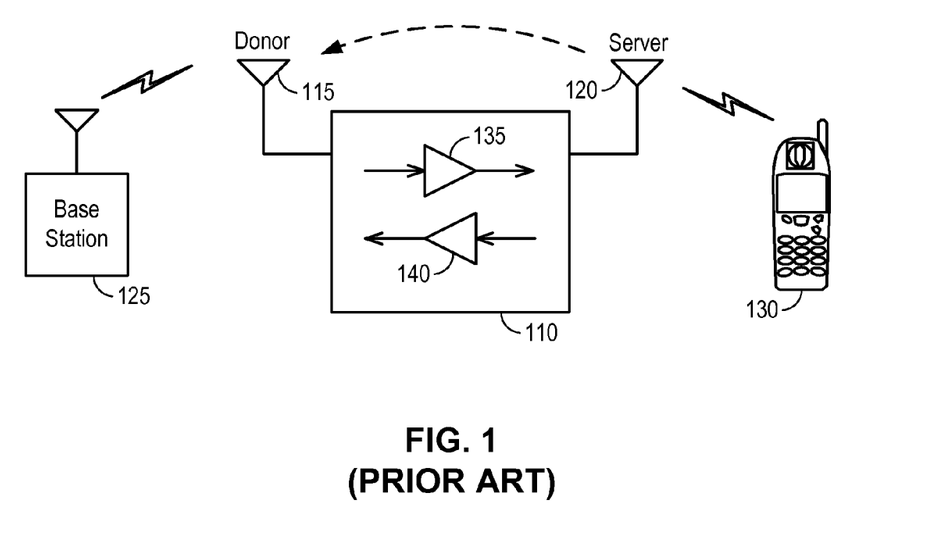
FIG. 1 is a simplified diagram of a repeater according to the prior art.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

Signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other echo cancellation techniques may be employed.

SUMMARY

Systems, apparatuses, and methods disclosed herein allow for enhanced repeater capability. According to one embodiment of the present invention, a wireless repeater having a first antenna and a second antenna to receive an input signal and transmit an amplified signal where the input signal is a sum of a remote signal to be repeated and a feedback signal resulting from a feedback channel between the first antenna and the second antenna includes a first receiver circuit coupled to the first antenna to receive the input signal and to generate a digitized input signal where the first receiver circuit is an intermediate frequency subsampling receiver having an intermediate frequency higher than baseband, a first transmitter circuit coupled to generate the amplified signal to transmit on the second antenna based on a digitized transmit signal where the first transmitter circuit is a direct conversion transmitter having an intermediate frequency at baseband, a second receiver circuit coupled to receive at least a portion of a signal to be transmitted prior to transmission over the second antenna and to generate a digitized transmit reference signal where the second receiver circuit is an intermediate frequency subsampling receiver, and a repeater baseband block coupled to the first receiver circuit, the second receiver circuit, and the first transmitter circuit. The repeater baseband block is operative to receive the digitized input signal from the first receiver circuit and to generate the digitized transmit signal for the first transmitter circuit, and further configured to receive the digitized transmit reference signal as a reference signal for channel estimation.

According to another aspect of the present invention, a method for providing echo cancellation in a wireless repeater in a wireless communication system includes receiving an input signal at a first antenna of the repeater where the input signal is a sum of a remote signal to be repeated and a feedback signal resulting from a feedback channel between the first antenna and a second antenna, converting the input signal to an intermediate frequency signal at a first intermediate frequency, generating a digitized input signal by subsampling the intermediate frequency signal at a sampling frequency, generating in-phase and quadrature-phase digitized transmit signals based on the digitized input signal, converting the in-phase and quadrature-phase digitized transmit signals to quadrature analog transmit signals at baseband frequency, upconverting and combining the quadrature analog transmit signals to generate a signal at a transmission frequency, generating an amplified signal based on the signal at the transmission frequency, transmitting the amplified signal on the second antenna, receiving at least a portion of a signal to be transmitted prior to transmission over the second antenna and generating a digitized transmit reference signal by converting the portion of the signal to be transmitted to a second intermediate frequency signal at the first intermediate frequency and subsampling the second intermediate frequency signal at the sampling frequency, and estimating a feedback channel between the first antenna and the second antenna using the digitized transmit reference signal as a reference signal for channel estimation and providing a feedback channel estimate.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may require substantially more isolation between the repeater's antennas. Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated). Thus, to ensure stability, a repeater's gain is traditionally limited to less than the isolation from the server antenna to the donor antenna, by some margin. When the gain of a traditional repeater exceeds its isolation, a positive feedback condition occurs resulting in oscillation. High gain and improved isolation form two contradicting demands required for modern day repeaters, especially those for indoor applications.

In some traditional repeaters, interference cancellation or echo cancellation is used to improve the isolation between the repeaters' donor and coverage antennas. Digital baseband interference cancellation is often employed in traditional repeaters to realize active isolation in the repeater, enabling the ability to achieve higher overall isolation and higher gain. Conventional digital baseband interference cancellation or echo cancellation is implemented by using samples of the transmit signal, in digital baseband, in conjunction with samples of the receive signals, also in digital baseband, to estimate the feedback channel (or the "leakage channel") between the donor antenna and the server antenna. The feedback channel estimate is then used to generate an estimated feedback signal, also referred to as the "estimated leakage signal." The estimated feedback signal is then subtracted from the receive signal to actively cancel the interference, thereby allowing higher gain to be used while preventing oscillation. Effective echo cancellation requires very accurate channel estimation. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to cancellation of an estimated leakage signal, which provides for partial or complete cancellation of the actual leakage signal.

However, real world impairments in practical receiver and transmitter circuitry of the repeater limit the performance of conventional interference cancellation approaches. Furthermore, for some repeater applications, such as for indoor coverage applications, it is desirable to have all associated electronics and antennas of the repeater to be housed in one small user installable structure. The repeater will require echo cancellation to be implemented for effective antenna isolation. The echo cancellation performance requirements for repeaters often exceed the typical capability of commodity components. To meet the desired echo cancellation performance requirements, high performance components have to be used, driving the cost of the transceiver components in repeaters to an unacceptable level.

Systems and techniques herein provide for a low cost and high performance hybrid radio architecture for a same frequency repeater which employs an RF reference signal for interference cancellation or echo cancellation. More specifically, the hybrid radio architecture incorporates an intermediate frequency (IF) subsampling receiver and a zero-IF (direct conversion) transmitter. In some embodiments, the IF used by the receiver has a low IF value in the range of 140-160 MHz which minimizes the performance demand on the receiver analog-to-digital converter. In the hybrid radio architecture, the receiver uses an IF that is a higher than the baseband IF used by the transmitter. The different in IF values used by the receiver and the transmitter improves the repeater's isolation between the receiver and the transmitter.

Furthermore, in some embodiments, the repeater implements interference cancellation is performed in baseband using the RF transmit signal as the reference signal for channel estimation. The RF reference signal improve the accuracy of the channel estimation, thereby improving the isolation between the repeater's donor antenna ("the receiving antenna" for the example of a forward link transmission) and the coverage antenna ("the transmitting antenna" for forward link transmissions). More importantly, by using the RF transmit signal instead of the digital baseband transmit signal as the reference signal, distortions to the transmit signal due to the transmitter circuitry of the repeater are accounted for and cancelled out as part of the estimated feedback signal. Accordingly, the requirements on the performance of the RF transmitter components in the repeater can be relaxed and the manufacturing cost of the repeater is reduced.

Figure 2:
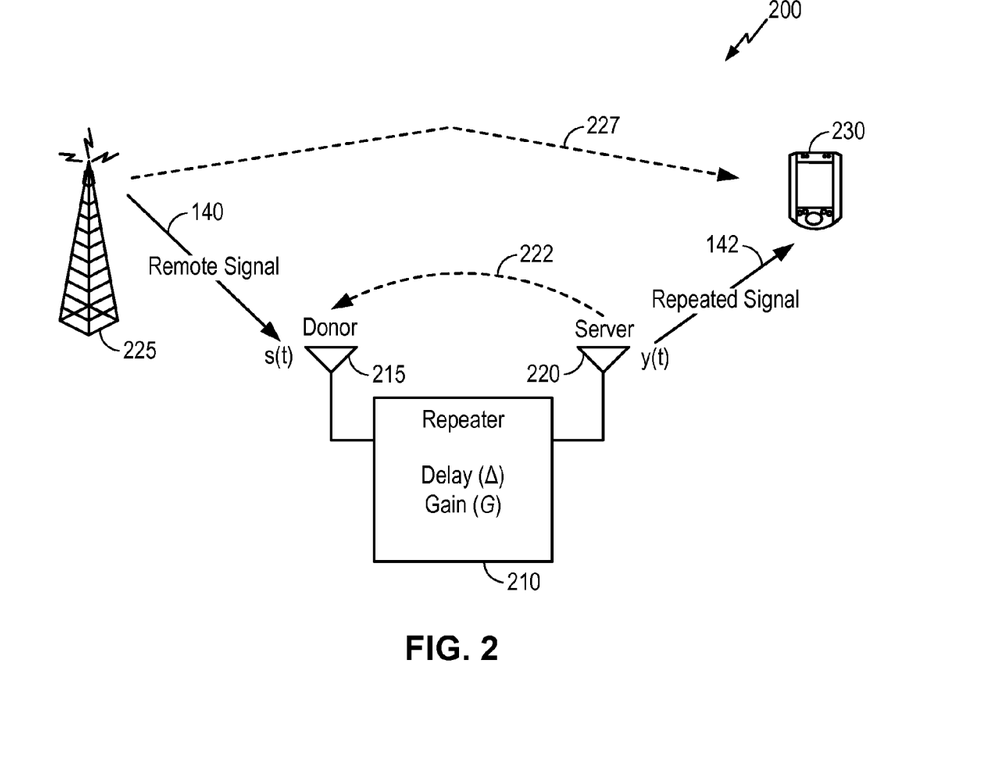
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2 illustrates forward link transmissions; i.e., a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay $\Delta$ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where $y(t)=\sqrt{G}s(t-\Delta)$. Ideally, the gain G would be large, the delay $\Delta$ of the repeater would be small, the input SNR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other techniques, the repeater would amplify this feedback signal, also referred to as the "leakage signal," as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay $\Delta$. Moreover, the output SINR of the repeater is dependent on non-linearities in the transceiver circuitry and in other signal processing functions.

Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), a WiMAX network and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Figure 3:
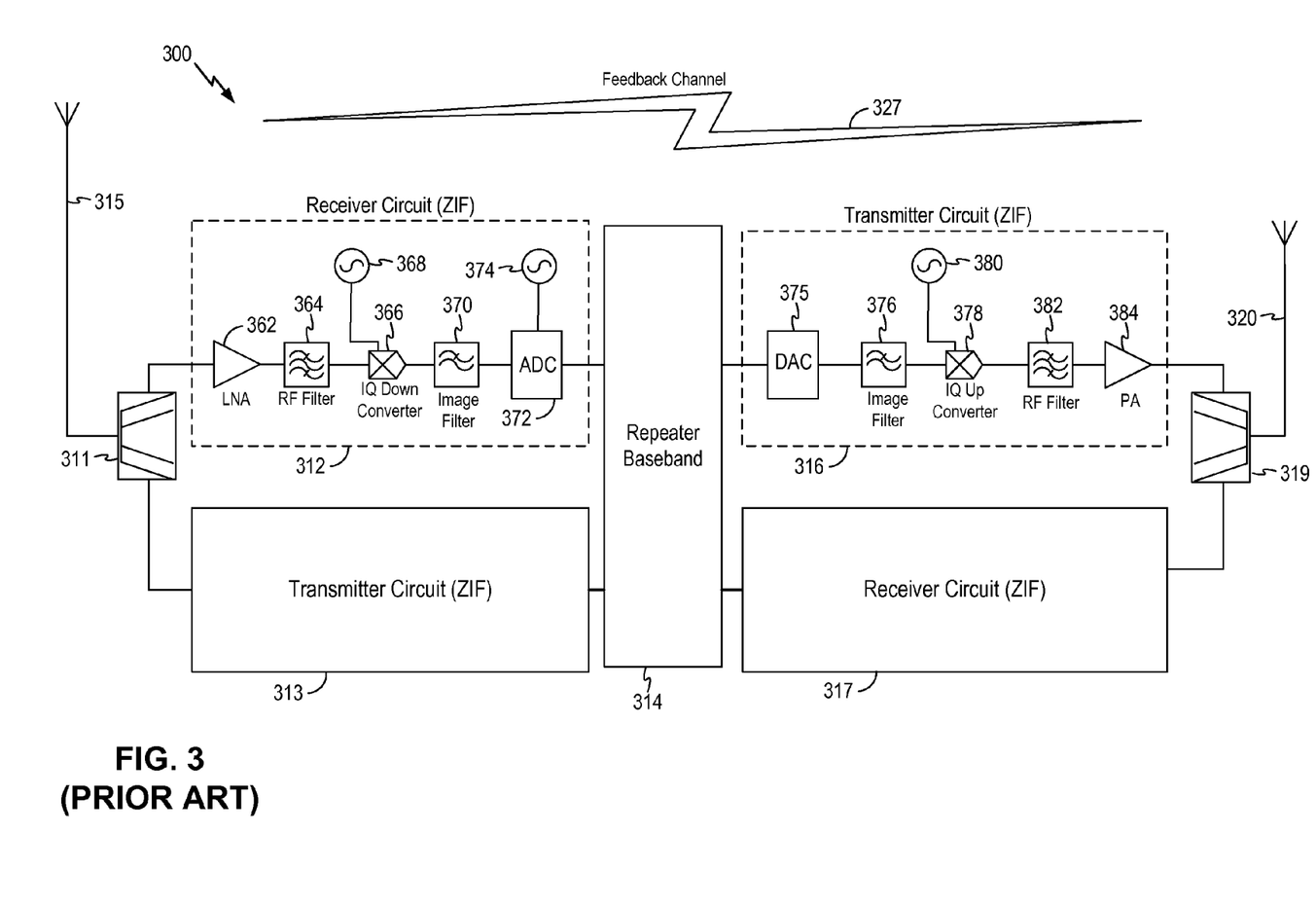
FIG. 3 is a schematic diagram of a conventional digital baseband interference cancellation repeater illustrating the receiver and transmitter circuits of the repeater.

FIG. 3 is a schematic diagram of a conventional digital baseband interference cancellation repeater illustrating the receiver and transmitter circuits of the repeater. For simplicity, FIG. 3 illustrates only the details of the forward link circuitry of a repeater 300 for receiving a remote signal on a donor antenna 315 and transmitting the amplified signal on a server antenna 320. The details of reverse link circuitry for transmission in the reverse direction are omitted but it is understood that the repeater contains the reverse link circuitry is implemented in the same manner as the forward link circuitry. In the illustration in FIG. 3, donor antenna 315 is coupled to a duplexer 311 operative to connect the donor antenna to either a receiver circuit 312 for receiving forward link communications or to a transmitter circuit 313 for transmitting reverse link communications. Similarly, server antenna 320 is coupled to a duplexer 319 operative to connect the server antenna to either a transmitter circuit 316 for transmitting forward link communications or to a receiver circuit 317 for receiving reverse link communications. In this manner, duplexers 311 and 319 each connects to a receiver circuit and a transmitter circuit to enable bi-directional (duplex) communication over the communication channel.

As shown in FIG. 3, a receiver circuit 312 (also referred to as the "receiver") receives from duplexer 311 a receive signal (sometimes referred to as "an input signal") being the remote signal to be amplified plus any feedback signal from the feedback channel 327 between the donor and server antennas. In the present illustration, receiver 312 is implemented as a direct-conversion receiver or a zero-IF receiver. Receiver 312 includes a low noise amplifier 362, an RF filter 364, an IQ down-converter 366 driven by a local oscillator 368, an image filter 370, and finally an analog-to-digital converter 372 driven by a local oscillator 374 to digitize the incoming signal. In one embodiment, RF filter 364 is an RF SAW filter. In other embodiments, RF filter 364 may be implemented using a ceramic filter or a FBAR filter or other suitable filters. The digitized signal is coupled to a repeater baseband block 314. Repeater baseband block 314 performs echo cancellation and signal amplification of the receive signal. Repeater baseband block 314 generates an echo cancelled digital transmit signal to be transmitted as the amplified signal on the server antenna 320. A transmitter circuit 316 (also referred to as the "transmitter") receives the digital transmit signal which is a digital baseband signal. Transmitter 316 includes a digital-to-analog converter 375, an image filter 376, an IQ up-converter 378 driven by a local oscillator 380, an RF filter 382 and a power amplifier (PA) 384. In one embodiment, RF filter 382 is an RF SAW filter. In other embodiments, RF filter 382 may be implemented using a ceramic filter or a FBAR filter or other suitable filters. Transmitter 316 generates the RF transmit signal from the digital transmit signal and provides the RF transmit signal to duplexer 319 to be transmitted on antenna 320.

In conventional repeater 300, channel estimation for echo cancellation is performed in repeater baseband block 314 using the signals generated within the repeater baseband block as the reference signal for channel estimation. In repeater baseband block 314, the feedback channel is estimated using digital samples of the transmit signal as the reference signal and also using digital samples of the receive signal. The channel estimate is then used to estimate the feedback signal using the digital samples of the transmit signal. The estimated feedback signal is then used to cancel out the undesired feedback signal in the receive signal, thereby providing active isolation and improving stability.

However, impairments in the transmitter circuit of repeater 300 limit the interference cancellation performance. More specifically, the transmitter circuitry introduces distortions into the RF transmit signal. The distortions can include quantization noise from the digital-to-analog converter (DAC) 375, phase noise from the local oscillator 380, IQ imbalance and linearity errors from IQ up converter 378, inter-channel interference (ICI) or inter-signal interference (ISI) from RF filter 382 and finally, non-linearity errors from the power amplifier 384. These transmitter distortions limit performance of the conventional repeater and add significant implementation cost if the performance limitations are to be overcome through transmitter circuit modifications.

Hybrid Radio Architecture with RF Reference

Figure 4:
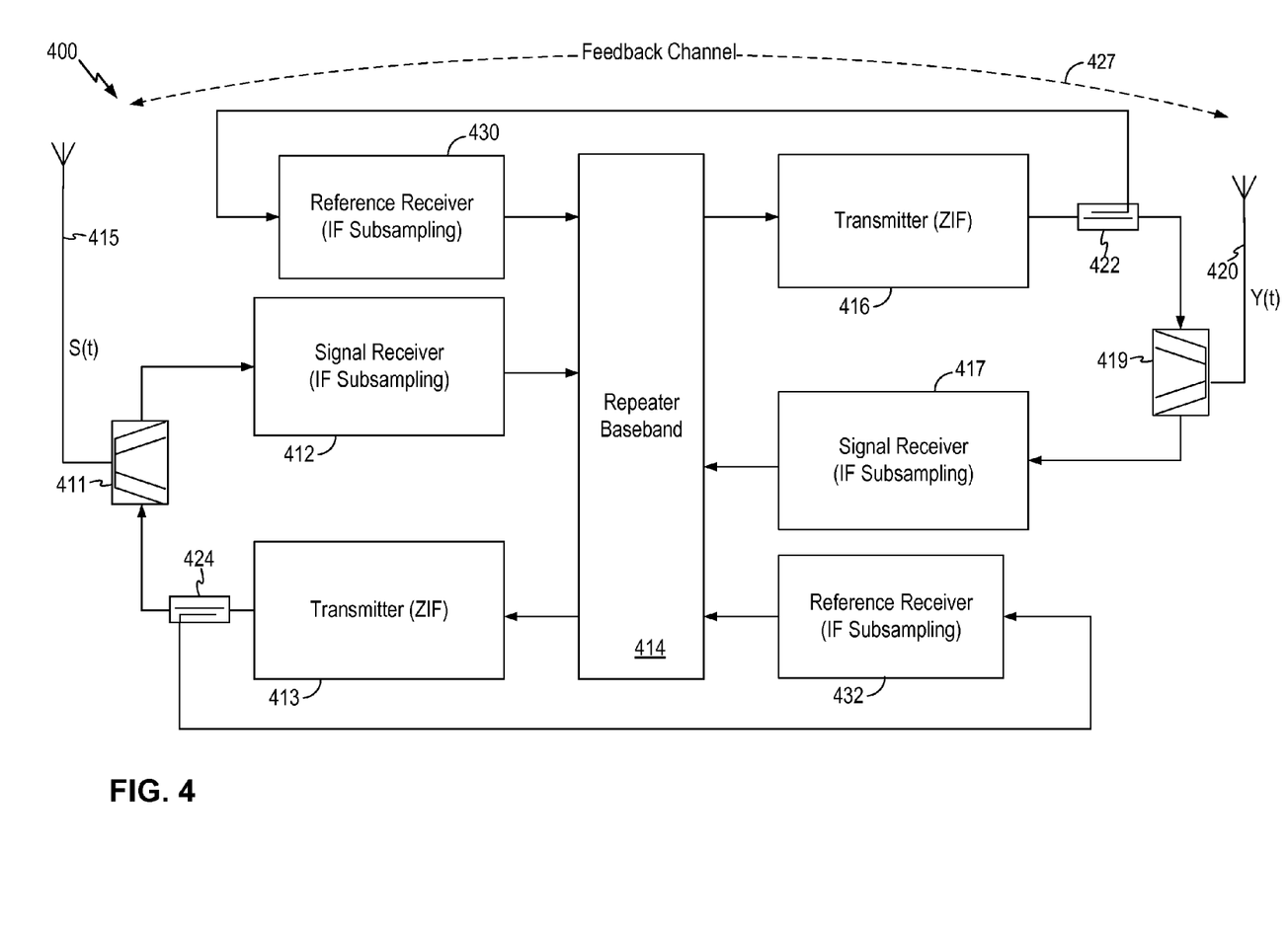
FIG. 4 is a schematic diagram of a repeater employing the hybrid radio architecture with RF reference signal for interference cancellation according to one embodiment of the present invention.

FIG. 4 is a schematic diagram of a repeater employing the hybrid radio architecture with RF reference signal for interference cancellation according to one embodiment of the present invention. Referring to FIG. 4, a repeater 400 includes a donor antenna 415 coupled to a receiver circuit 412 ("a receiver") and a transmitter circuit 413 ("a transmitter") through a duplexer 411. Repeater 400 also includes a server antenna 420 coupled to a transmitter circuit 416 and a receiver circuit 417 through a duplexer 419. Receiver 412 and transmitter 416 implements forward link communications in repeater 400 where antenna 415 receives a remote signal to be repeated and antenna 420 transmits the amplified signal Y(t). Receiver 417 and transmitter 413 implements the reverse link communication where a remote signal to be repeated is received on antenna 420 and the amplified signal is transmitted on antenna 415.

Receiver 412 of repeater 400 receives a receive signal S(t) being the sum of the remote signal to be amplified plus the feedback signal (or the leakage signal) resulted from the feedback channel 427 between the donor antenna and server antenna. Repeater 400 also includes a repeater baseband block 414 for processing the receive signal, such as performing channel estimation, echo cancellation and signal amplification.

In the present discussion, receiver circuit 412 and receiver circuit 417 are sometimes referred to as a "signal receiver" and transmitter circuit 416 and transmitter circuit 413 are sometimes referred to as a "signal transmitter" to indicate that the receiver circuit 412, 417 are used to receive the desired remote signal and the transmitter circuit 416, 413 are used to transmit the desired amplified signal.

According to one aspect of the present invention, repeater 400 is implemented using a hybrid radio architecture. More specifically, repeater 400 implements the receiver circuits (412, 417) using an intermediate frequency (IF) subsampling receiver. In the present description, an intermediate frequency (IF) subsampling receiver refers to a receiver which downconverts the receive signal to an intermediate frequency signal having a predetermined IF value and then subsamping the intermediate frequency signal during the analog-to-digital conversion process at a given sampling frequency. By first converting to an IF signal and then subsampling, the sampling frequency can be much less than the carrier of the IF signal or the receive signal. In one embodiment, the IF subsampling receiver uses a low IF where "low IF" refers to a frequency value much lower than the carrier frequency of the remote signal. In some embodiments, the IF subsampling receiver uses a low IF values in the hundreds of megahertz range (e.g. 140-160 MHz) when the remote signals have a carrier frequency in the gigahertz range (e.g. 2 GHz). Furthermore, in some embodiments, the sampling frequency used by the receiver for subsampling the intermediate frequency signal is in the range of tens of megahertz (e.g. 20-40 MHz).

Meanwhile, repeater 400 implements the transmitter circuit (413, 416) using a zero-IF (direct conversion) transmitter. A zero-IF or direct conversion transmitter refers to a transmitter receiving in-phase (I) and quadrature-phase (Q) signals from the repeater baseband block. The direct conversion transmitter upconverts and combines the in-phase and quadrature-phase I and Q signals from baseband (IF=0 MHz) to the transmission frequency in one frequency conversion step. As thus constructed, the receiver of the repeater has a higher IF than the baseband IF used by the direct conversion transmitter. The difference in IF between the receiver circuit and the transmitter circuit has the effect of improving the isolation of the receiver and the transmitter. The improved isolation allows the use of low cost receiver/transmitter components to obtain the same level of desired transmit power.

According to another aspect of the present invention, repeater 400 implements an RF reference signal for interference cancellation. More specifically, repeater 400 implements interference cancellation in baseband using the RF transmit signal as the reference signal for channel estimation. Referring to FIG. 4, repeater 400 includes a reference receiver circuit 430 for receiving the RF transmit signal prior to over-the-air transmission. In the present embodiment, reference receiver 430 samples the RF transmit signal through a directional coupler 422 coupled to the output of signal transmitter 416 before the input to the duplexer 419. Reference receiver 430 generates a digital baseband signal based on the RF transmit signal for use by the repeater baseband block 414 as the reference signal for channel estimation. It is instructive to note that reference receiver 430 for receiving the RF transmit signal Y(t) is separate from the signal receiver 412 which is used to receive the incoming remote signal S(t) in the forward link. In the present embodiment, directional coupler 422 is used to enable reference receiver 430 to sample the RF transmit signal at the server antenna 420. In other embodiments, other techniques, such as a signal splitter, can be used to sample the output of the transmitter and feed back a portion of the transmitted signal to the reference receiver. In the reverse link, a reference receiver 432 is provided to sample the RF transmit signal through a directional coupler 424 coupled to the output of signal transmitter 413 before the input to the duplexer 411.

In the present embodiment, the reference signal generated by reference receiver 430, 432 is used for channel estimation for forward/reverse link communications. As thus constructed, the reference signal derived from the RF transmit signal will include distortions caused by the transmitter circuits 416, 413, respectively. These distortions are then accounted for in the channel estimation and echo cancellation process so that improved interference cancellation performance is attained without requiring the use of costly non-commodity components. More specifically, using the RF transmit signal as the reference signal for channel estimation rather than using a digital baseband reference signal generated in the repeater baseband block will allow the channel estimation reference signal to include distortions due to the transmitter circuit. As discussed above, the transmitter distortion can include such as DAC quantization noise, phase noise, IQ imbalance and linearity errors, ICI and ISI noise, and power amplifier non-linearity errors. Because these transmitter distortions are included in the reference signal sampled by the reference receiver, the transmitter distortions will be cancelled out as part of the leakage signal. When the transmitter distortions can be thus removed, the requirements placed upon the RF transmitter components in the interference cancellation repeater are relaxed, allowing for use of low cost commodity components, thereby reducing manufacturing cost. Furthermore, in some embodiments, use of the RF transmit signal as the channel estimation reference signal has been shown to improve the SNR (signal-to-noise ratio) of the repeated signal by 8 to 10 dB, and the output power by at least 10 dB due to the reduced linearity requirements.

In the present illustration, reference receiver 430 is a dedicated receiver for receiving the RF transmit signal at antenna 420 prior to over-the-air transmission in the forward link while reference receiver 432 is a dedicated receiver for receiving the RF transmit signal at antenna 415 prior to over-the-air transmission over the reverse link. In this manner, channel estimation and echo cancellation of both the forward and reverse link is realized as echo cancellation for the forward link and the reverse link are typically provided separately in separate baseband blocks.

When repeater 400 is constructed with both forward link and reverse link circuitry, reference receiver 430 is a separate receiver from signal receiver 412 for receiving the forward link remote signal and is also a separate receiver from signal receiver 417 for receiving the reverse link remote signal. Similarly, the reference receiver 432 is a separate receiver from signal receiver 412 for receiving the forward link remote signal and is also a separate receiver from signal receiver 417 associated for receiving the reverse link remote signal. In the present embodiment, both reference receivers 430 and 432 are implemented using the same receiver structure as the signal receivers. That is, both reference receivers 430 and 432 are implemented as IF subsampling receivers.

Repeater 400 using a hybrid radio architecture with RF reference for interference cancellation realizes many advantages over conventional repeater architectures. First, because the receiver and the transmitter are operating on different IFs, the receiver and transmit frequency plans do not collide. As a result, both the transmitter and receiver circuits can be implemented using low cost components as isolation between the receiver and transmitter is less of an issue in the repeater operation. Furthermore, the IF subsampling receiver can be implemented using a low sampling rate to further reduce cost and increase the performance.

Second, by using an RF reference signal for channel estimation, a significant amount of impairments due to the transmitter circuitry is removed, resulting in higher performance. More specifically, signal impairments due to IQ imbalance and DC offset at the zero-IF transmitter is compensated through the RF reference. At the receiver side, a IF subsampling receiver, instead of a zero-IF receiver, is used and thus no IQ imbalance or DC offset issue presents at the receiver. The hybrid architecture with the RF reference thus enables higher repeater performance using low cost components. For instance, if the receiver is implemented as a zero-IF receiver, the IQ imbalance and DC offset impairments typically associated with a zero-IF receiver have to be calibrated out to a very high level for echo cancellation to work properly. Hence, using a zero-IF receiver would require high cost components and is typically difficult to implement. By using an IF subsampling receiver, issues such as IQ imbalance and DC offset are obviated.

Figure 5:
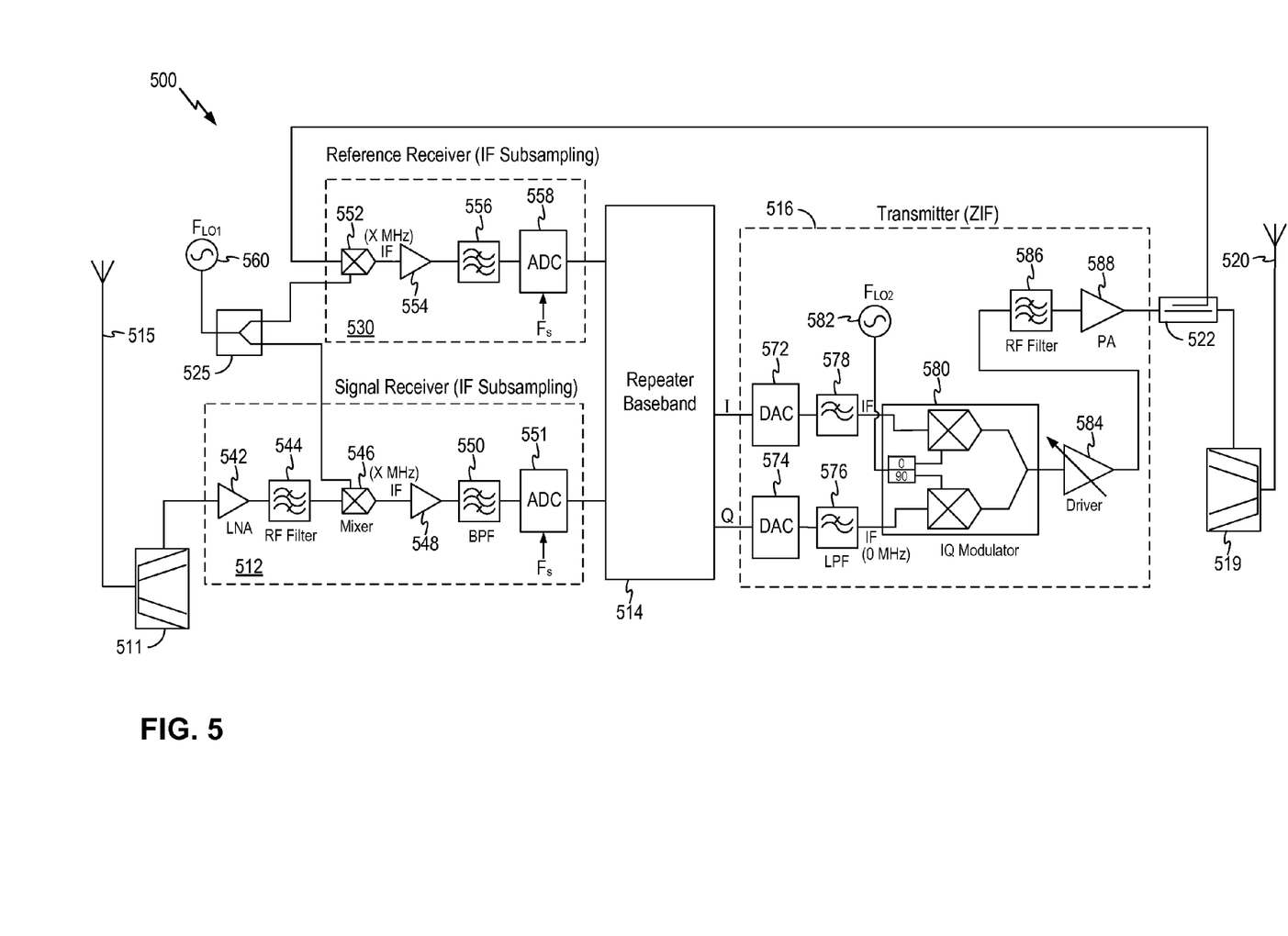
FIG. 5 is a detailed schematic diagram of a repeater employing the hybrid radio architecture with RF reference signal for interference cancellation according to one embodiment of the present invention.

FIG. 5 is a detailed schematic diagram of a repeater employing the hybrid radio architecture with RF reference signal for interference cancellation according to one embodiment of the present invention. Referring to FIG. 5, a repeater 500 includes a donor antenna 515 connected to a duplexer 511 and a server antenna 520 connected to a duplexer 519. In the present illustration, only the forward link circuitry of repeater 500 for receiving a remote signal on donor antenna 515 and transmitting the amplified signal on a server antenna 520 is shown. The reverse link circuitry for transmission in the reverse direction is omitted in the present illustration to simplify the drawing. It is understood that the repeater contains both forward link and reverse link circuitry for complete repeater functionality. In FIG. 5, donor antenna 515 is shown coupled to duplexer 511 operative to connect the donor antenna to either a receiver circuit for receiving forward link communications or to a transmitter circuit (not shown) for transmitting reverse link communications. Similarly, server antenna 520 is shown coupled to duplexer 519 operative to connect the server antenna to either a transmitter circuit 516 for transmitting forward link communications or to a receiver circuit (not shown) for receiving reverse link communications. It is understood that duplexers 511 and 519 each connects to a receiver circuit and a transmitter circuit to enable bi-directional (duplex) communication over the communication channel.

Repeater 500 includes a receiver circuit 512, a repeater baseband block 514 and a transmitter circuit 516. Receiver circuit 512 is configured as an IF subsampling receiver while transmitter circuit 516 is configured as a zero-IF transmitter (also known as a direct-conversion transmitter) to implement the hybrid radio architecture. To that end, receiver circuit 512 (also referred to as the "receiver") receives an input signal from duplexer 511. The signal received at receiver 512 is referred to as the receive signal (or the "input signal") and includes the remote signal to be amplified as well as any feedback signal from the feedback channel. Receiver 512 includes a low noise amplifier 542 for amplifying the receive signal, an RF filter 544 for filtering the receive signal, a mixer 546 for downconverting the receive signal to an IF signal, an amplifier 548 for amplifying the IF signal, a bandpass filter 550 to bandpass filter the amplified IF signal and finally an analog-to-digital converter 551 to digitize the filtered and amplified IF signal at a sampling frequency of $F_s$. The digitalized signal is coupled to a repeater baseband block 514. In one embodiment, RF filter 544 may be an RF SAW filter. In other embodiments, RF filter 544 may be implemented using a ceramic filter or a FBAR filter or other suitable filters.

The IF signal is obtained by mixing the receive signal with a local oscillator signal having a local oscillator frequency $F_{LO1}$. The local oscillator frequency $F_{LO1}$ is selected to generate the IF signal having the desired IF frequency which is lower than the carrier frequency of the receive signal. In some embodiments, the local oscillator frequency $F_{LO1}$ has a value equal to the sum of the carrier frequency of the receive signal and the desired IF. ADC 551 is disposed to digitize the IF signal at a sampling frequency of $F_s$ which is substantially lower than the IF. In some embodiments, the sampling frequency $F_s$ is in the range of tenths of MHz when the IF is in the range of hundreds of MHz.

Repeater baseband block 514 performs echo cancellation and amplification of the input signal. Repeater baseband block 514 generates a digital transmit signal to be transmitted as the amplified signal on the server antenna 520. Transmitter circuit 516 (also referred to as the "transmitter") receives the digital transmit signal which is a digital baseband signal. Transmitter 516, being a direct-conversion transmitter, receives the in-phase I and quadrature-phase Q digital transmit signals from repeater baseband block 514. Transmitter 516 includes a pair of digital-to-analog converters 572, 574 to convert the in-phase I and quadrature-phase Q digital transmit signals to quadrature analog transmit signals at baseband (IF=0 MHz). Transmitter 516 further includes a pair of low pass filters 576, 578 for low pass filtering the analog RF transmit signals, an IQ up-converter (or modulator) 580 driven by a local oscillator 582 to upconvert and combine the quadrature analog baseband transmit signals to generate the RF transmit signal. Transmitter 516 further includes a variable gain driver 584 to amplify the RF transmit signal, an RF filter 586 to filter the amplified RF transmit signal and a power amplifier (PA) 588 for amplifying the filtered RF transmit signal. Transmitter 516 provides the RF transmit signal to duplexer 519 to be transmitted on antenna 520. In one embodiment, RF filter 586 may be an RF SAW filter. In other embodiments, RF filter 586 may be implemented using a ceramic filter or a FBAR filter or other suitable filters.

To implement the RF reference for interference cancellation, repeater 500 includes a reference receiver 530 coupled to receive the RF transmit signal prior to the transmit signal being coupled to over-the-air transmission. In the present embodiment, a directional coupler 522 is used to sample the output of transmitter 516 after the power amplifier 588 and feed back a portion of the sampled signal to reference receiver 530. In other embodiments, a splitter or other techniques to sample the output of the transmitter and feed back a portion of the signal to the reference receiver can be used.

In the present embodiment, reference receiver 530 mirrors the construction of signal receiver 512. That is, reference receiver 530 is also constructed as an IF subsampling receiver. More specifically, reference receiver 530 includes a mixer 552 for downconverting the sampled RF transmit to an IF signal, an amplifier 554 for amplifying the IF signal, a bandpass filter 556 to bandpass filter the amplified IF signal and finally an analog-to-digital converter 558 to digitize the filtered and amplified IF signal at a sampling frequency of $F_s$. The digitalized signal is coupled to repeater baseband block 514 for use as the reference signal for channel estimation. Reference receiver 530 does not duplicate all components of the IF subsampling receiver 512 because the RF transmit signal is sampled prior to over-the-air transmission and thus not all receiver elements are necessary to receive the sampled signal. For instance, the sampled signal coupled back from the directional coupler 522 does not need to be amplified because the RF transmit signal was just amplified by the transmitter circuit 516 prior to the directional coupler 550. Thus, the low noise amplifier element can be omitted. Also, the sampled signal would be in the correct frequency band and thus a filter for band-limiting the sampled signal is not necessary.

Reference receiver 530 takes the RF transmit signal and converts the RF transmit signal into digital samples which are then provided to repeater baseband block 514 as the reference signal for channel estimation. Repeater baseband block 514 uses the digital samples of the RF transmit signal in estimating the feedback channel. The estimated feedback channel is then used in cancelling out the feedback signal in the receive signal to implement echo cancellation. By using an RF reference signal just prior to over-the-air transmission, distortions due to circuitry in the transmitter 516 is accounted for in the interference cancellation operation.

In the above described embodiments, the RF transmit signal is sampled from the last stage of the transmitter circuit. That is, the RF transmit signal is sampled at a point after the power amplifier 588. In other embodiments of the present invention, the RF transmit signal can be taken at other stages in the transmitter circuit after the digital-to-analog converter. For instance, the RF transmit signal can be taken before the power amplifier or before the RF filter. The RF transmit signal is sampled at these earlier stages by the use of a direction coupler or a splitter or other techniques to sample the transmit signal and feed back a portion of the signal to the reference receiver, as described above. Of course, when the RF transmit signal is taken from a point including less than all the transmitter components, distortions associated with those components would not be accounted for in the channel estimation and echo cancellation process. Therefore, it is advantageous to sample the RF signal at a point after the last transmitter component (such as the power amplifier 588) so that distortions associated with all of the transmitter circuitry are accounted for. However, it is possible to sample the RF transmit signal at an earlier point in the transmitter circuit as long as the distortion contribution of the remaining components is not significant.

Furthermore, in the above described embodiments, duplexers are used to connect to a receiver circuit and a transmitter circuit to enable bi-directional (duplex) communication over the communication channel. In other embodiments, the repeater of the present invention may be deployed in a WiMAX (Worldwide Interoperability for Microwave Access) communication network. A WiMAX repeater is described in commonly assigned and copending U.S. patent application Ser. No. 11/730,361, entitled "Enhanced physical layer repeater for operation in WiMAX systems," of James Proctor et al., filed Mar. 30, 2007, and published as U.S. Patent Publication No. 2007/0268846 A1, which application is incorporated herein by reference in its entirety. A WiMAX network may employ Time Division Duplex (TDD) to separate the uplink and downlink communication signals. Using TDD, a single frequency channel is assigned to both the transmitter and the receiver and both the uplink and downlink traffic use the same frequency but at different times. When the repeater of the present invention is deployed in a WiMAX network employing TDD, a switch may be used in place of the duplexer in FIG. 4 and FIG. 5 to separate and direct the uplink and downlink traffic to the respective receiver or transmitter circuit.

Figure 6:
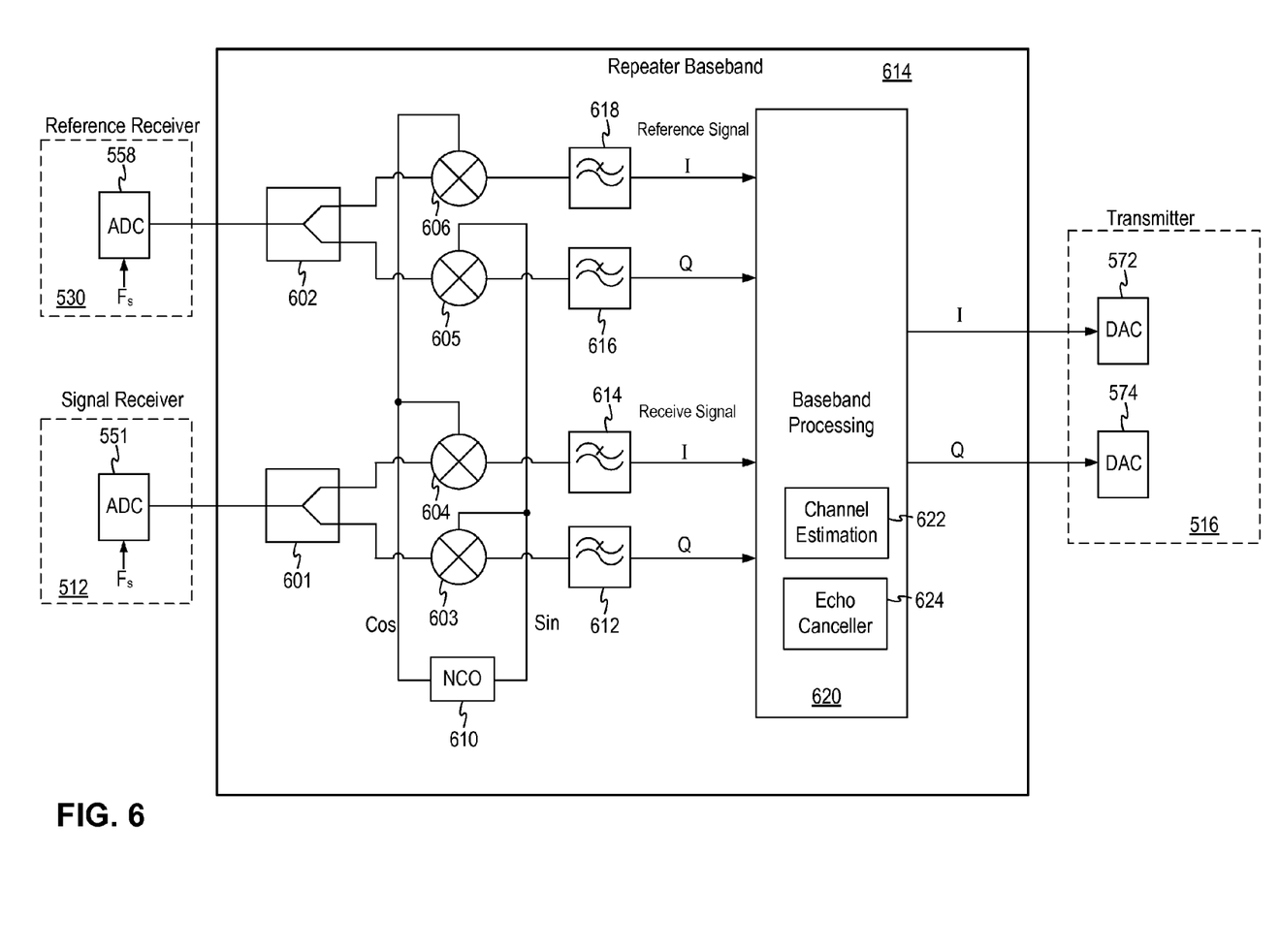
FIG. 6 is a schematic diagram of the repeater baseband block according to one embodiment of the present invention.

FIG. 6 is a schematic diagram of the repeater baseband block according to one embodiment of the present invention. Referring to FIG. 6, a repeater baseband block 614 includes a pair of digital quadrature down converters to convert the digitized IF signals from the signal receiver and the reference receiver to baseband. That is, ADC 551 and ADC 558 provides digital data bits representative of the IF signals of the receive signal and the reference signal to the repeater baseband block 614. More specifically, a digital quadrature down converter for the digital data bits associated with the receive signal is formed by a signal splitter 601, mixers 603, 604 and low pass filters 612, 614. The digital in-phase I signal and quadrature-phase Q signal are thus generated for the digital data bits associated with the receive signal and provided to a baseband processing block 620 for baseband processing. Another digital quadrature down converter for the digital data bits associated with the reference signal is formed by a signal splitter 602, mixers 605, 606 and low pass filters 616, 618. The digital quadrature signals I and Q are thus generated for the digital data bits associated with the reference signal and provided to baseband processing block 620 for baseband processing. Mixers 603, 604, 605 and 606 are driven by quadrature clock signals generated by a numerically controlled oscillator (NCO) 610. NCO 610 generates a first clock signal (cosine phase) for mixers 604 and 606 and a second clock signal with a 90° offset (sine phase) for mixers 603 and 605.

At baseband processing block 620, channel estimation is performed at a channel estimation block to estimate the feedback channel of the repeater and computes an estimate of the feedback signal for the purpose of echo cancellation. In the present embodiment, the digital samples of the RF transmit signal are provided to the baseband processing block 620 as the reference signal for channel estimation. That is, instead of using the digital transmit signal generated within the repeater baseband block as the channel estimation reference signal, the channel estimation algorithm receives a reference signal from outside of the repeater baseband block 614 where the reference signal is derived from the RF transmit signal. More specifically, reference receiver 530 of the repeater receives a sample of the RF transmit signal just prior to over-the-air transmission and generates a digital baseband reference signal based on the sampled RF transmit signal. The sample of the RF transmit signal is obtained from a point after the transmitter circuit 516 outside of the repeater baseband block and through the use of a directional coupler for example. Baseband processing block 620 may employ different channel estimation algorithms, including frequency domain channel estimation or time domain channel estimation.

Baseband processing block 620 includes an echo canceller 624 for performing echo cancellation where the estimated feedback signal is subtracted from the receive signal to generate an echo-cancelled signal. According to embodiments of the present invention, the echo-cancellation realizes partial or complete cancellation of the undesired feedback signal in the receive signal. Baseband processing block 620 generates in-phase I and quadrature-phase Q digital transmit signals which are coupled to the transmitter of the repeater for digital-to-analog-conversion.

In accordance with some embodiments, multiple antenna modules can be constructed within the same repeater, such as multiple directional antennas or antenna pairs and multiple omni or quasi-omni-directional antennas for use, for example, in a multiple-input-multiple-output (MIMO) environment or system. These same antenna techniques may be used for multi-frequency repeaters such as FDD based systems where a downlink is on one frequency and an uplink is present on another frequency. Repeaters configured for receiving MIMO signal streams are described in the following copending and commonly assigned U.S. patent applications: U.S. patent application Ser. No. 12/439,018, entitled "Repeater Techniques For Multiple Input Multiple Output Utilizing Beam Formers," of James Proctor Jr. et al., filed Oct. 26, 2007, published as U.S. Patent Publication No. 2009/0323582 A1; U.S. patent application Ser. No. 12/041,598, entitled "Physical Layer Repeater Utilizing Real Time Measurement Metrics and Adaptive Antenna Array to Promote Signal Integrity and Amplification," of James Proctor Jr. et al., filed Mar. 3, 2008, and published as U.S. Patent Publication No. 2008/0225775 A1; and U.S. patent application Ser. No. 11/340,838, entitled "Physical layer repeater configuration for increasing MIMO performance," of James Proctor Jr. et al., filed Jan. 27, 2006, and published as U.S. Patent Publication No. 2006/0193271 A1. The aforementioned patent and patent applications are incorporated herein by reference in their entireties.

Accordingly, in some embodiments of the present invention, a repeater for a wireless communication network employs the hybrid radio architecture with RF reference signal for interference cancellation as described above and is further configured to include multiple receiving antennas and multiple transmitting antennas to support MIMO data traffic. In one embodiment, the repeater includes first and second signal receiver circuits coupled to first and second receiving antennas for receiving a plurality of multiple in multiple out (MIMO) signal streams on different paths, and first and second transmitter circuits coupled to first and second transmitting antennas. The repeater may further include: a signal combiner for combining the plurality of MIMO signal streams according to various mathematical combinations to generate a plurality of combined MIMO signal streams; and a weighting circuit for applying a weight to each of the plurality of MIMO signal streams to generate a plurality of weighted MIMO signal streams. The weighted MIMO signal streams may be transmitted on the first and/or second transmitting antennas. As thus configured, the repeater is capable of receiving and transmitting MIMO signal streams and is useful for repeating MIMO signals from an outdoor environment to an indoor environment. MIMO signals are often blocked by building structures and do not reach indoor locations. The repeater of the present invention can be used to recreate the MIMO signal streams indoor to improve communication performance.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Also, computer instructions/code may be transmitted via signals over physical transmission media from a transmitter to a receiver. For example, if the software is transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A wireless repeater having a first antenna and a second antenna to receive an input signal and transmit an amplified signal, the input signal being a sum of a remote signal to be repeated and a feedback signal resulting from a feedback channel between the first antenna and the second antenna, the repeater comprising:

a first receiver circuit coupled to the first antenna to receive the input signal and to generate a digitized input signal, the first receiver circuit being an intermediate frequency subsampling receiver having an intermediate frequency higher than baseband;

a first transmitter circuit coupled to generate the amplified signal to transmit on the second antenna based on a digitized transmit signal, the first transmitter circuit being a direct conversion transmitter having an intermediate frequency at baseband;

a second receiver circuit coupled to receive at least a portion of a signal to be transmitted prior to transmission over the second antenna and to generate a digitized transmit reference signal, the second receiver circuit being an intermediate frequency subsampling receiver; and a repeater baseband block configured to receive the digitized input signal from the first receiver circuit and to generate the digitized transmit signal for the first transmitter circuit, and further configured to receive the digitized transmit reference signal as a reference signal for channel estimation.

2. The wireless repeater of claim 1, wherein the repeater baseband block is further configured to access a feedback signal estimate, and to cancel the feedback signal estimate from the digitized input signal to generate the digitized transmit signal, the repeater baseband block including a channel estimation block to estimate the feedback channel and to provide a feedback channel estimate using the digitized transmit reference signal as the reference signal for channel estimation.

3. The wireless repeater of claim 1, wherein the second receiver circuit is coupled to receive at least a portion of the amplified signal generated by a power amplifier of the first transmitted circuit as the signal to be transmitted.

4. The wireless repeater of claim 1, further comprising a directional coupler coupled between the first transmitter circuit and the second antenna, the second receiver circuit coupled to receive a portion of the amplified signal from the directional coupler.

5. The wireless repeater of claim 1, further comprising a splitter coupled between the first transmitter circuit and the second antenna, the second receiver circuit coupled to receive a portion of the amplified signal from the splitter.

6. The wireless repeater of claim 1, wherein the first transmitter circuit comprises a pair of digital-to-analog converters and one or more transmitter components, and the second receiver circuit is coupled to receive at least a portion of a signal at the one or more transmitter components within the first transmitted circuit after the pair of digital-to-analog converters as the signal to be transmitted.

7. The wireless repeater of claim 1, wherein a channel estimation block estimates the feedback channel using frequency domain channel estimation.

8. The wireless repeater of claim 1, wherein the repeater baseband block further comprises an echo canceller coupled to receive a feedback channel estimate from the channel estimation block and generate a feedback signal estimate based on the feedback channel estimate and a signal to be transmitted, the echo canceller coupled to cancel the feedback signal estimate from the input signal.

9. The wireless repeater of claim 1, wherein the first receiver circuit comprises one or more elements to receive and process the input signal and the second receiver circuit comprises one or more as that of the first receiver circuit.

10. The wireless repeater of claim 9, wherein the first receiver circuit implemented as an intermediate frequency subsampling receiver comprises: a low noise amplifier coupled to receive the input signal, an RF filter coupled to filter the input signal, a mixer coupled to downconvert the input signal to an intermediate frequency signal, an amplifier coupled to amplify the intermediate frequency signal, a bandpass filter coupled to filter the amplified intermediate frequency signal, and an analog-to-digital converter coupled to digitize the filtered amplified intermediate frequency signal at a first sampling frequency, and the second receiver circuit includes at least a mixer, an amplifier, a bandpass filter, and an analog-to-digital converter operating at the first sampling frequency.

11. The wireless repeater of claim 1, wherein the first transmitter circuit further comprises a pair of digital-to-analog converters coupled to convert in-phase and quadrature-phase digitized transmit signals to quadrature analog transmit signals at baseband frequency, a pair of low pass filters coupled to filter the quadrature analog transmit signals, an IQ up-converter coupled to upconvert and combine the quadrature analog transmit signals to form an RF transmit signal, a variable gain driver to amplify the RF transmit signal, an RF filter to filter the amplified RF transmit signal and a power amplifier to amplify the filtered RF transmit signal as the amplified signal.

12. The wireless repeater of claim 1, wherein each of the first and second receiver circuits is configured to convert the input signal to an intermediate frequency signal at the intermediate frequency and subsample the intermediate frequency signal at a sampling frequency.

13. The wireless repeater of claim 12, wherein the input signal has a carrier frequency in the gigahertz range, the intermediate frequency has a value in the hundreds of megahertz range and the sampling frequency has a value in the tens of megahertz range.

14. The wireless repeater of claim 1, wherein the first transmitter circuit is configured to convert in-phase and quadrature-phase digital transmit signals to quadrature analog transmit signals at baseband frequency and to upconvert and combine the quadrature analog transmit signals to generate the amplified signal in one frequency conversion.

15. The wireless repeater of claim 1, wherein the first antenna of the wireless repeater comprises first and second receiving antennas, and the second antenna of the wireless repeater comprises first and second transmitting antennas, the wireless repeater further comprising:

the first receiver circuit comprising first and second receiver circuits coupled to the first and second receiving antennas for receiving a plurality of input multiple in multiple out (MIMO) signal streams on different paths;

the first transmitter circuit comprising first and second transmitter circuits for transmitting a plurality of output MIMO signal streams;

a signal combiner for combining the plurality of input MIMO signal streams according to various mathematical combinations to generate a plurality of combined MIMO signal streams; and a weighting circuit for applying a weight to each of the plurality of combined MIMO signal streams to generate a plurality of weighted MIMO signal streams, the weighted MIMO signal streams being transmitted on the first or second transmitting antenna.

16. A wireless repeater having a first antenna and a second antenna to receive an input signal and transmit an amplified signal, the input signal being a sum of a remote signal to be repeated and a feedback signal resulting from a feedback channel between the first antenna and the second antenna, the repeater comprising:

first means for receiving the input signal from the first antenna and for generating a digitized input signal, the first means for receiving the input signal being an intermediate frequency subsampling receiver having an intermediate frequency higher than baseband;

means for generating the amplified signal to transmit on the second antenna based on a digitized transmit signal, the means for generating the amplified signal being a direct conversion transmitter having an intermediate frequency at baseband;

second means for receiving at least a portion of a signal to be transmitted prior to transmission over the second antenna and generating a digitized transmit reference signal, the second means for receiving being an intermediate frequency subsampling receiver; and means for receiving the digitized input signal from the first means for receiving and generating the digitized transmit signal for the means for generating the amplified signal, the means further for receiving the digitized transmit reference signal as a reference signal for channel estimation.

17. A method for providing echo cancellation in a wireless repeater in a wireless communication system, comprising:

receiving an input signal at a first antenna of the repeater, the input signal being a sum of a remote signal to be repeated and a feedback signal resulting from a feedback channel between the first antenna and a second antenna;

converting the input signal to an intermediate frequency signal at a first intermediate frequency;

generating a digitized input signal by subsampling the intermediate frequency signal at a sampling frequency;

generating in-phase and quadrature-phase digitized transmit signals based on the digitized input signal;

converting the in-phase and quadrature-phase digitized transmit signals to quadrature analog transmit signals at baseband frequency;

upconverting and combining the quadrature analog transmit signals to generate a signal at a transmission frequency;

generating an amplified signal based on the signal at the transmission frequency;

transmitting the amplified signal on the second antenna;

receiving at least a portion of a signal to be transmitted prior to transmission over the second antenna and generating a digitized transmit reference signal by converting the portion of the signal to be transmitted to a second intermediate frequency signal at the first intermediate frequency and subsampling the second intermediate frequency signal at the sampling frequency; and estimating a feedback channel between the first antenna and the second antenna using the digitized transmit reference signal as a reference signal for channel estimation and providing a feedback channel estimate.

18. The method of claim 17, wherein receiving at least a portion of a signal to be transmitted prior to transmission over the second antenna comprises receiving at least a portion of the amplified signal as the signal to be transmitted.

19. The method of claim 17, wherein receiving at least a portion of a signal to be transmitted prior to transmission over the second antenna comprises receiving at least a portion of a signal during the generating of the amplified signal as the signal to be transmitted.

20. The method of claim 17, wherein estimating a feedback channel comprises estimating the feedback channel using frequency domain channel estimation.

21. The method of claim 17 further comprising:

estimating a feedback signal estimate using the feedback channel estimate; and cancelling the feedback signal estimate from the digitized input signal.

22. The method of claim 17, wherein the input signal has a carrier frequency in the gigahertz range, the first intermediate frequency has a value in the hundreds of megahertz range and the sampling frequency has a value in the tens of megahertz range.

* * * * *